May 1, 1934.                T. M. COSTAKOS                1,957,391
                      DISPENSING AND MIXING DEVICE
                    Filed March 21, 1932        3 Sheets-Sheet 1
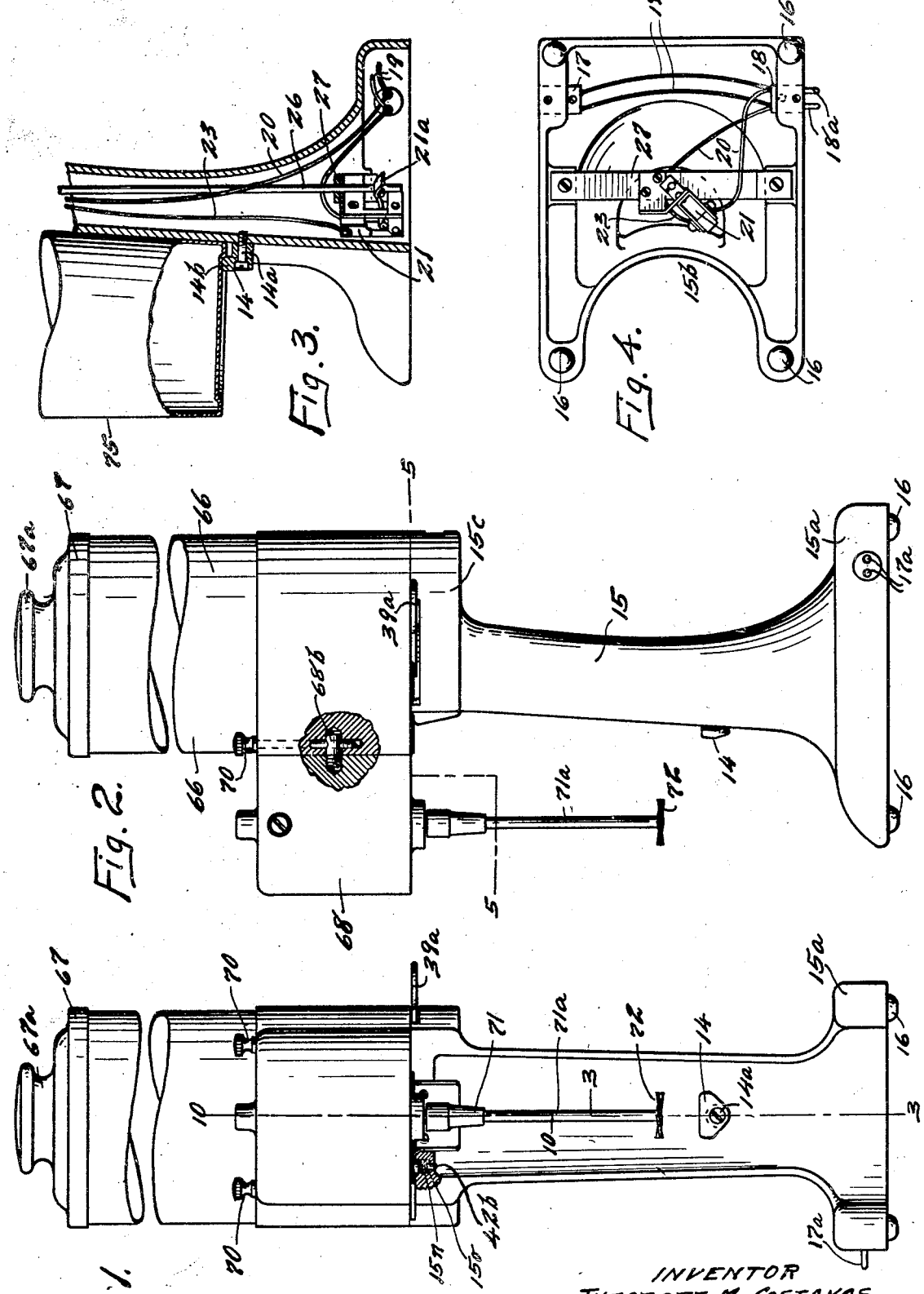

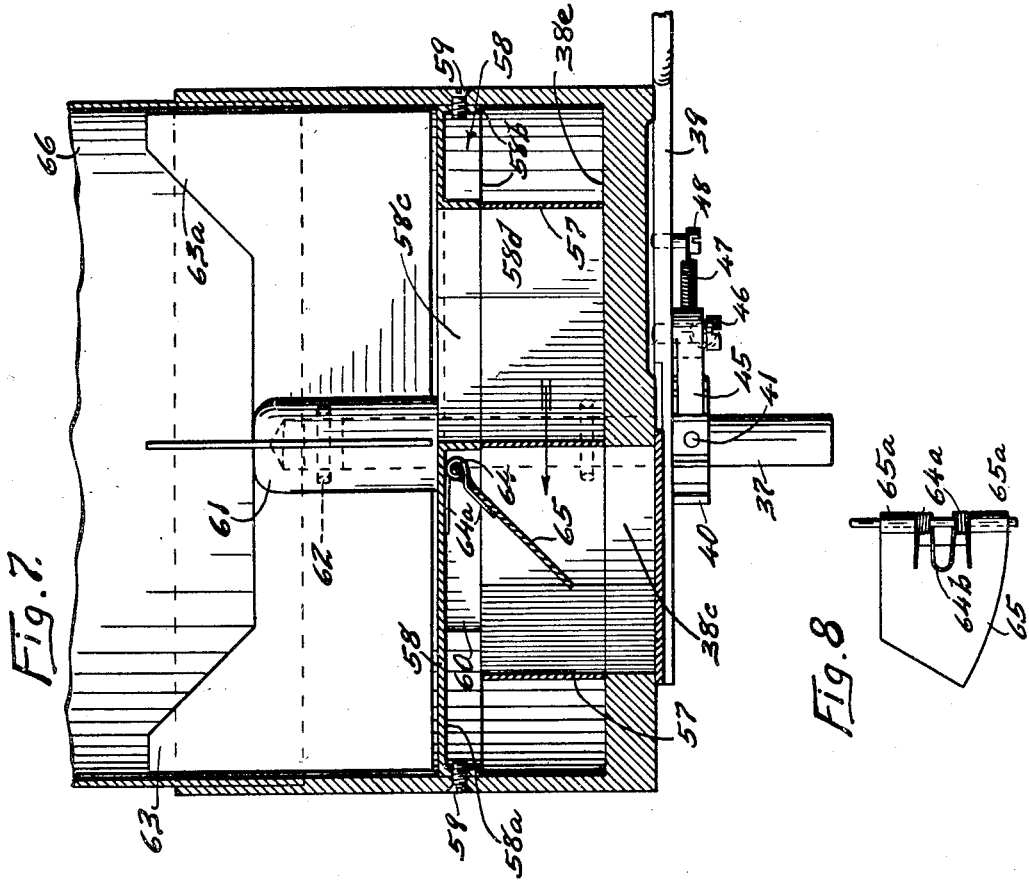
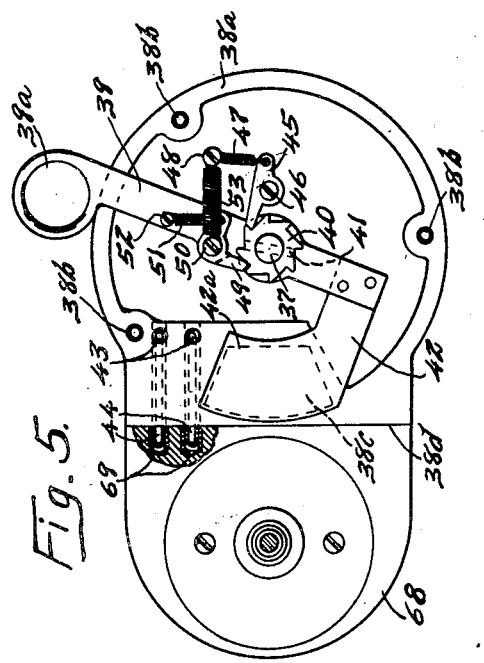
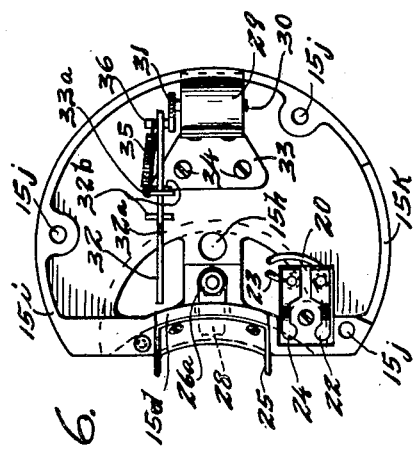

May 1, 1934.　　　T. M. COSTAKOS　　　1,957,391

DISPENSING AND MIXING DEVICE

Filed March 21, 1932　　3 Sheets-Sheet 3

INVENTOR
THEODORE M. COSTAKOS
BY *Reif & Braddock*
ATTORNEYS

Patented May 1, 1934

1,957,391

UNITED STATES PATENT OFFICE 1,957,391

DISPENSING AND MIXING DEVICE

Theodore M. Costakos, Minneapolis, Minn.

Application March 21, 1932, Serial No. 600,289

10 Claims. (Cl. 225—21)

This invention relates to a dispensing mechanism, and while the dispensing mechanism may be variously applied, it particularly is designed for use in connection with a drink mixing device. It is now the common practice to make various kinds of mixed drinks at soda fountains, and it is desirable to have a simple, efficient and convenient device for stirring or mixing the drinks and for dispensing into the receptacle in which the drinks are mixed certain comminuted substance such as malted milk. It is desirable to have such a device of pleasing appearance and comprising a construction which is small and positive in operation. The container for the substance to be dispensed should have therein a stirrer and mechanism should be provided to dispense different portions of the substance and positively discharge the same into the drink receptacle.

It is an object of this invention, therefore, to provide a very simple and efficient mixing and dispensing device, one having comparatively few parts which are conveniently arranged and easily operated.

It is a further object of the invention to provide a dispensing device for a drink mixer having a convenient and easily accessible operating means for dispensing a definite portion of material, and means for positively discharging said material.

It is another object of the invention to provide a mixing and dispensing device comprising a standard, a member removably mounted on said standard having a front surface and a motor casing disposed in front of said member, and having a surface engaging said surface, said motor casing having portions extending into said member, together with removable means for passing through said member and portions and holding the motor casing in position.

It is still another object of the invention to provide a simple and efficient mixing and dispensing device comprising a standard, a member mounted on said standard embodying a dispensing mechanism, a mixing member, a container in which said mixing member is disposed, and a motor casing, all of said parts being easily and separably removable for the purpose of cleaning or inspection.

These and other objects and advantages of the invention will be fully set forth in the following description made in connection with the accompanying drawings, in which like reference characters refer to similar parts throughout the several views, and in which:—

Fig. 1 is a view in front elevation of the device, a certain portion of the container being broken away;

Fig. 2 is a view in side elevation with a portion of the container broken away;

Fig. 3 is a vertical section through the lower part of the standard, taken on line 3—3 of Fig. 1 and showing a portion of the drink mixing receptacle in position;

Fig. 4 is a bottom plan view of the device;

Fig. 5 is a horizontal section taken on line 5—5 of Fig. 2 as indicated by the arrows, a portion being broken away;

Fig. 6 is a top plan view of the standard with the portion mounted thereon removed;

Fig. 7 is a partial central vertical section of Fig. 1 showing a dispensing mechanism on an enlarged scale;

Fig. 8 is a plan view of the ejecting device used;

Figure 9:
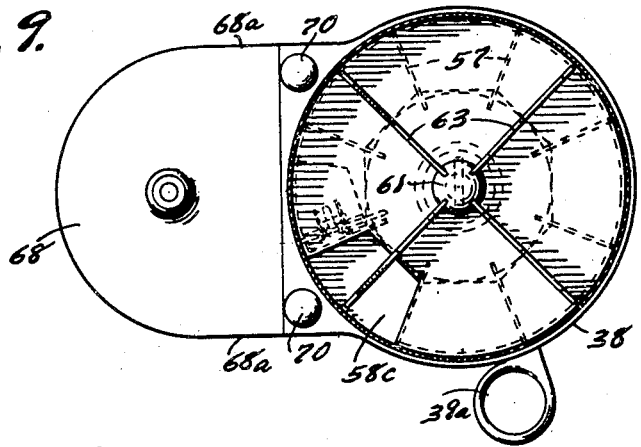
Fig. 9 is a horizontal section taken on line 9—9 of Fig. 10 as indicated by the arrows.
Figure 10:
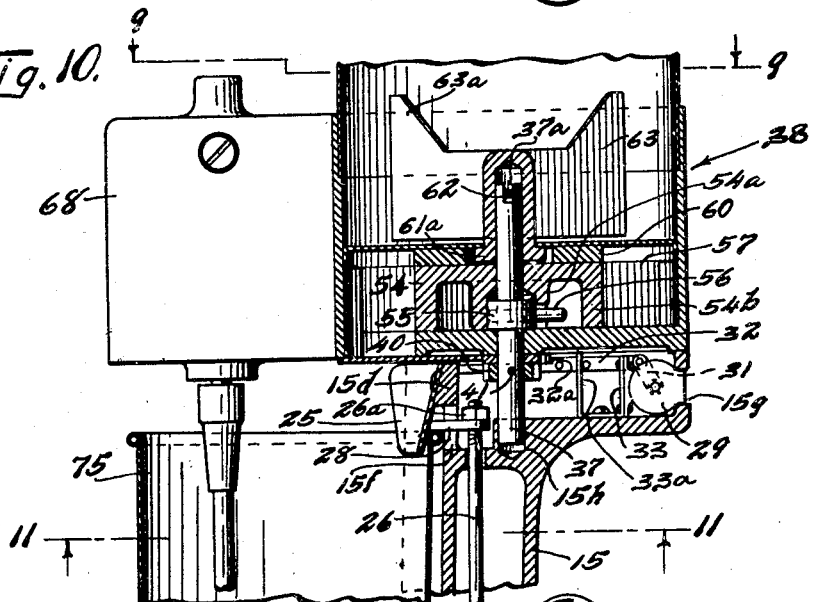
Fig. 10 is a vertical section taken on line 10—10 of Fig. 1, the motor casing being shown in side elevation; and a portion of the receptacle being shown in vertical section.
Figure 11:
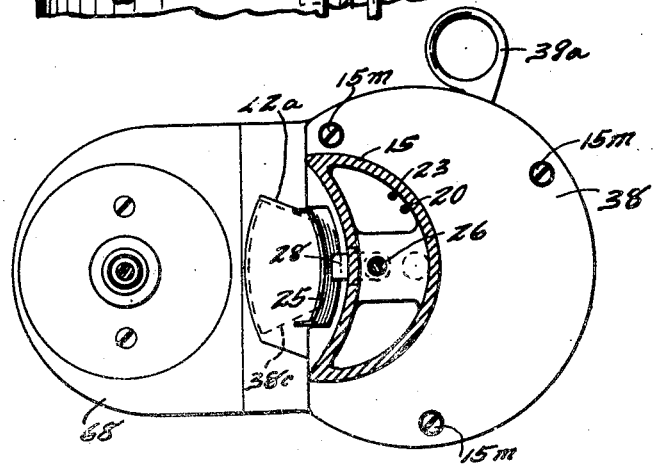
Fig. 11 is a horizontal section taken on line 11—11 of Fig. 10 as indicated by the arrow, the receptacle being omitted.

Referring to the drawings, a device is shown comprising a standard 15. While this standard might have various forms, in the embodiment of the invention illustrated it is shown as comprising a base portion 15a having a semi-circular recess or open portion 15b at its front, and having supporting legs or knobs 16 disposed at the corner of a rectangle, as seen in Fig. 4, which legs preferably will be of some yielding material such as rubber. The sides and rear of the base 15a are disposed at right angles as shown in Fig. 4. Said base has inserted in one side thereof an electrical socket 17 having openings 17a adapted to receive the prongs of an electrical plug or to receive prongs such as the prongs 18a projecting from an electrical plug 18 disposed in the opposite side of the base. With this construction several of the devices can be placed side by side and the prongs 18a of one will enter the holes 17a of the other, thus connecting the devices electrically, so that only one electrical connection to a source of current will be necessary for the group.

A pair of conductors 19 connect the sockets 17 to the plug 18 and a pair of conductors 20 extend from plug 18a, one of which is connected to the contact of a switch 21 secured in said base and the other of which extends upward to the top of said standard, as shown in Fig. 6 and is connected to a contact member 22. Another electrical conductor 23 extends from switch 21 to the top of the base and is connected to another contact member 24 similar to member 22.

The standard 15 has a top portion 15c partly circular in shape, as shown in Fig. 6. A projection 15d upstands from the top front part of portion 15c and has a slightly concave front surface to which is secured a chute 25. Switch 21 has an operating lever 21a beneath which extends the bent lower end of a rod 26 which passes through a strap support 27 extending across the base beneath the same and which rod extends through an aperture 15e in the top of the base. Said rod 26 is threaded at its upper end and has secured thereon by means of a nut 26a, a projecting lug 28 extending transversely to the rear side of chute 25 and projecting through an opening 15f in the front of portion 15c so that it may move vertically in said opening. Rod 26 is adapted to close a switch 21 when it is lifted and said switch moves to open position when said rod is released. The top of portion 15c is recessed and has an opening 15g extending through its rear portion in which is disposed the rear end of a counter mechanism 29, the registering numbers of said counter being visible through said opening. Said counter has an operating shaft 30, to one end of which is attached an operating arm 31 having connected to its other end a bar 32. Bar 32 is supported in a small U-shaped bracket 33 to which the counter 29 is also secured. Bracket 33 is secured to the top of portion 15c by the screws 34. A tensile coil spring 35 is secured at one end to a pin 36 projecting from the outer end of arm 31 and to which bar 32 is connected, and said spring is connected at its other end to the projecting portion of bracket 33. Stop pins 32b project from bar 32 and are adapted to engage the upstanding part 33a of bracket 33. The rear pin 32b limits the movement of bar 32 under the influence of spring 35. Bar 32 has its front portion cut away to form a vertically extending surface or shoulder 32a adapted to be engaged by a member to be later described. Standard 15 has secured centrally thereof somewhat adjacent its bottom, a rest 14 secured by a headed countersunk screw 14a. Rest 14 has an outer flange 14b extending thereacross at its outer side.

Portion 15c has formed centrally therein a bore 15h which receives the lower end of shaft 37 which projects downward from a member 38 resting on and engaging the top of portion 15c and containing a dispensing mechanism. Member 38 has a substantially flat bottom about which extends at some distance below the same an outer rib 38a having a finished lower surface which engages the similar finished surface on the outer rim or rib 15i and the portion 15c. Member 38 is secured to the standard 15 by screws 15m extending upwardly through holes 15j into tapped holes 38b in the rim 38a. Member 38 has a central boss, the lower surface of which is in the same plane as the surface of rim 38a. A lever 39 is provided having flat sides, one side of which is disposed against the bottom of said boss, shaft 37 passing through and fitting a hole in said lever so that said lever is oscillatable about shaft 37. A ratchet wheel 40 is secured to shaft 37 by the pin 41. Lever 39 projects at one side of the device and passes through and is movable in the recess 15k formed in rim 15i of portion 15c, said lever having a ring handle 39a at its outer end. Lever 39 has secured thereto at its other end a plate 42 which extends at right angles to said lever for a short distance and then has a sector-shaped portion 42a arranged concentrically with shaft 37. Member 38 has a sector-shaped opening 38c extending vertically therethrough, as shown in dotted lines in Fig. 5, and this opening is normally covered by the plate 42 which fits tightly against the bottom thereof, said opening 38c extending through the finished surface 38a on the bottom of member 38 which is of considerable width and surrounds opening 38c. A headed pin 42b is seated in a recess 15n and pressed upward against plate 42a by a spring 15o to hold it close against surface 38a. Member 38 also has a pair of contact pins 43 adapted to engage the contacts 22 and 24 and contact pins 44 extend forwardly from the pins 43 and project at the front of member 38, which front has a flat finished surface 38d thereon. The ratchet 40 is engaged by a stop dog 45 pivoted on a screw 46 which secures it to the bottom of member 38. Dog 45 has an extension connected by a tensile spring 47 to a screw 48 secured in the bottom of member 38. Ratchet 40 is also engaged by a propelling dog 49 pivoted on a screw 50 which extends from lever 39 and secures said dog to said lever. Dog 49 has an arm projecting at an angle to the portion engaging ratchet 40 to the end of which is secured one end of a tensile coil spring 51, the other end of which is secured to a screw 52 in turn secured to lever 39. Another tensile coil spring 53 has one end secured to screw 48 and the other secured to screw 50. It will be apparent that when lever 39 is engaged by the handle 39a and said handle moved in a counter-clockwise direction, that dog 49 will engage a tooth of ratchet 40 and rotate said ratchet and shaft 37. The lever 39 would then be moved against the tension of spring 53. Stop dog 45 snaps over a tooth, and when lever 39 is released, it will be drawn back to the position shown in Fig. 5 by spring 53 and dog 45 will prevent any reverse movement of ratchet 40. Dog 49 will move over the tooth on ratch 40 in position to again move said ratchet. The end of lever 39 opposite that on which handle 39a is formed, is disposed above the end of bar 32 and adapted to engage the shoulder 32a each time that said lever is oscillated. Bar 32a is moved rearwardly against the tension of spring 35, and arm 31 is oscillated to operate counter 29 one step. When lever 39 is released, spring 35 again moves the bar 32 forwardly. Each oscillation of lever 39 is thus recorded on the counter 29.

Member 38 is bored to have a cylindrical recess therein having the bottom 38e. A dispensing wheel 54 is disposed in member 38 and has a hub 54a bored at its lower side to surround a collar 55 secured to shaft 37, said shaft extending upwardly through a bore in the bottom of member 38 and through a bore in the top of hub 54a. A pin 56 projects from one side of collar 55 through a slot in hub 54a. Hub 54a has a portion 54b extending thereabout at some distance therefrom, said hub and portion being connected at the top and having a common flat top surface. Member 54b has an octagonal periphery. A plurality of thin blades 57 are secured in portion 54b and project radially from the corners thereof to the wall of a bore or chamber in member 38. It will thus be seen that when shaft 37 is rotated by ratchet 40 that collar 55 will be rotated and member 54 and the radial blades 57 will also be rotated. Said ratchet is provided with the same number of teeth as there are blades 57, which number as illustrated, is eight, and member 54 is thus rotated one-eighth of a revolution for each actuation of lever 39. When lever 39 is in normal position, the opening or space between two of the blades 57 registers in the opening 38c which extends through the bottom of member 38. The agitating unit designated generally as 58 is removably mounted on top of member 54. Member 58 comprises a plate 58a having an annular rim or flange 58b fitting within the bore of member 38 and held therein by a pair of small countersunk headed screws 59. Plate 58a has an opening 58c extending therethrough substantially the same size and shape as opening 38c and of the same size and shape of the space or opening between a pair of blades 57. The opening 58c is surrounded by a depending flange 58d. A washer 60 is secured to the bottom of plate 58a having its lower surface flush with the bottom of flanges 58b and 58d, said washer resting upon the top surface of member 54. The shaft 37 extends upwardly above plate 58 and has a diametral slot 37a extending transversely of its upper end. A cylindrical hub member 61 is provided, having a flange 61a at its lower end, the top surface of which forms a ledge or shoulder over which the plate 58a extends, said plate thus snugly surrounding the member 61. Member 61 is bored to fit over the upper end of the shaft 37 and has a pin 62 extending transversely of its bore adapted to seat in the slots 37a. Member 61 is thus removably connected to said shaft. A plurality of blades 63 shown as four in number are secured to member 61 and extend radially therefrom substantially to the wall of member 38. Said blades are shown as having upwardly extending trapezoidal shaped projections 63a at their outer ends. A pin 64 is secured in washer 60 and a plate 65 has ears 65a formed thereon through which pin 64 extends, so that said plate is pivoted on said pin. A spring 64a has coils disposed about pin 64 and has a central bight portion 64b engaging and secured to the upper side of plate 65 while its end portions engage the bottom of plate 58a. Spring 64a thus normally holds plate 65 extending downwardly at an angle as shown in Fig. 7. As member 54 is rotated, the lower side of plate 65 will be engaged by the blades 57 and the top edges thereof, and will be moved upwardly against the tension of spring 64a as said blades 57 pass thereunder. As each blade 57 passes the extreme edge of plate 65 the latter will be urged downwardly suddenly by the spring 64a. The upper end of member 38 is counterbored to receive the cylindrical receptacle 66, the inner wall of said receptacle being flush with the inner wall of member 38. Member 66 fits snugly in member 38 and can be readily removed therefrom. Member 66 is provided with a lid 67 having a central knob-like handle 67a.

A motor casing 68 is provided, having a semi-cylindrical front portion, the sides 68a of which project rearwardly in parallel relation to be flush with the sides of the front portion of member 38. Casing 68 has a rear flat surface fitting against the front surface 38d of member 38. Said casing also has a pair of sockets 69 therein into which extend the pins 44. Members 69 are connected with the terminals of a motor disposed within casing 68 so that an electrical connection is made between said motor and the switch 21. Said casing 68 has lugs 68b projecting into the front portion of member 38 which are vertically apertured, and headed pins 70 are provided which extend downwardly through openings in member 38 and through the openings in lugs 68b to hold casing 68 in place against member 38. It will be seen that casing 68 can thus be readily removed by the lifting and removal of pin 70. The armature shaft of the motor in casing 68 depends therefrom and has secured thereto by the member 71 a shaft 71a having a mixing element 72 on its lower end. Said mixing element comprises a plurality of outwardly extending flat blades extending at a slight angle to the horizontal, said blades being shown as four in number.

In operation the material to be dispensed, such as powdered malted milk, will be placed in container 66. This can be done by removing the lid 67. Material passes down the plate 58a between the blades 63. Some of the material will pass through the opening 58c down into a space between two of the blades 57. It will be noted that the blades 57 move under the plate 58a except where they are beneath opening 58c. The material fills the space between the blades 57 which are at either side of the opening 58c, and is in position to be dispensed. When a drink is to be mixed, the operator takes the receptacle shown as 75, disposes the upper edge thereof in the rear of the chute 25 and lifts the receptacle so that its lower edge is supported upon the step or rest 14. Said receptacle may have the central part of its bottom pressed upward to form a rim around the edge, which can be disposed back of the flange 14b. When receptacle 75 is moved to this position its edge engages the lug 28 and raises rod 26. This closes switch 21 and current is thus supplied to the motor in casing 68 so that stem 71a and the mixer 72 are rotated by said motor. If the operator desires to dispense a portion of material from container 66 into receptacle 75, he now places his finger in the ring handle 39a and draws said handle forwardly. This operates ratchet 40 so that shaft 37 is rotated one-eighth of a revolution. This brings the two plates 57 which are now beneath opening 58c into position to be disposed at either side of opening 38c. As these plates move over opening 38c, plate 42a is moved from beneath opening 38c so that the material drops from between the plates 57 downwardly through opening 38c and is directed by chute 25 into the receptacle 75. As the first or advancing plate 57 is moved, it engages plate 65 and raises said plate up against the tension of spring 64a. When the advancing plate moves past the plate 65, the same is released and snaps downwardly to the position shown in Fig. 7. Should any material be stuck in between the plates 57 it will be engaged by this plate 65 and propelled downwardly so that the space between plates 57 will be entirely cleared of material. When the plates 57 at either side of the opening 58c are moved from beneath said opening, the next pair of plates comes into position so that the space therebetween registers with opening 58c and said space is filled with material. On the next actuation of lever 39, this material will be discharged through the opening 38c. The material then passes from the container 66 and member 38 only through the opening 58c and all of the spaces between plates 57 are not filled at once. With devices in which such a series of openings are all filled at one time, the material is apt to pack in the spaces and not be properly discharged. The blades 63 keep the material loosened and move the same so that it falls readily through the opening 58c. After the operator pulls the handle 39a forwardly, he releases the same and it is moved to normal position as shown in Fig. 5, by a spring 53. Plate 42 is then again moved back over the opening 38c so that no material will drop therefrom until the lever 39 is again operated. With each actuation of lever 39 the counter 29 is actuated and a record can thus be had of the number of drinks prepared using the material. The material will be mixed and stirred in receptacle 75 by member 72 as long as desired, and the receptacle 75 will then be removed. When this is done, rod 26 drops down by gravity, opening switch 21 and stopping the motor in casing 65.

The parts of the device can be easily separated and removed. The casing 68 can be readily removed by withdrawing the pins 70. The container 66 as stated can be removed from member 38 by a lifting and turning movement. The agitating member 58 including washer 60 and the plate 65 can readily be detached by removing screws 59 and then lifting the same upwardly and withdrawing the pin 62 from the slot 37a. The member 54 with plates 57 can then be lifted out simply by lifting hub 54a from collar 55 and pin 56. The member 38 can be lifted off with shaft 37 by removing the screws 15m from the holes 30b. When member 38 is removed, the top of the standard is exposed, as shown in Fig. 6. It is thus seen that the parts are all easily removed and the various elements thus readily accessible for inspection and cleaning.

From the above description it is clear that applicant has provided a very simple and efficient mixing and dispensing device and one that is very compact and very easy and convenient in operation. The device is very neat in appearance and easily and quickly placed in position. The same has been actually demonstrated in actual practice and found to be very successful and efficient.

It will, of course, be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:—

1. A dispensing mechanism having in combination, a standard having a top portion, a shaft journaled at its lower end in said top portion, a member having a chamber therein mounted on said portion thorugh which said shaft extends, said member having a bottom with an opening therethrough at one side thereof, leading from said chamber, a ratchet wheel secured to said shaft below said member, a lever for actuating said ratchet wheel journaled on said shaft and projecting at the side of said portion, said lever carrying a plate movable close to said bottom to close said opening, a dispensing wheel in said member secured to said shaft, a container above said member, and an agitator secured to the upper end of said shaft.

2. The structure set forth in claim 1, said wheel and agitator being connected to said shaft by a slot and pin connection and readily removable from said shaft by a lifting movement.

3. A mixing and dispensing device having in combination, a standard having a base and a supporting portion at its top, a member carrying a dispensing mechanism mounted on said supporting portion, said member having a front surface, a motor casing having a surface engaging said front surface and having portions receivable in said member, removable means passing through said member and portions for holding said motor casing in position, and a mixer carrying shaft extending from said casing alongside of said standard.

4. A dispensing device having in combination, a standard having a hollow portion at its top with an opening through the side thereof, a container for material carried by and above said portion, a counter device having its visible registering portion alined with said opening, a reciprocable member mounted in said standard and connected at one end to said counter, resilient means for moving said member in one direction and holding the same in normal position, a dispensing mechanism mounted on said portion, an operating member for said dispensing mechanism constructed and arranged to engage and move said member at each actuation thereof and operate said counter.

5. A dispensing device having in combination, a standard having a supporting portion at its upper end, a member bolted to said portion, a container removably mounted on and extending above said member, said container having an opening at its bottom and a flat under surface surrounding said opening, a shaft journaled at its lower end in said standard and projecting through said member into said container, an agitating device in said container rotated by said shaft but removably therefrom by a lifting movement, a dispensing wheel in said member rotated by said shaft but removably therefrom by a lifting movement, a ratchet wheel secured to said shaft below said member for rotating said shaft, a hand lever journaled on said shaft and extending between said standard supporting portion and member for operating said ratchet wheel and carrying means movable in engagement with said flat under surface to close said opening.

6. The structure set forth in claim 5, a counter mechanism mounted in said supporting portion, said portion having a lateral opening through which said counter is visible, an arm connected to said counter, a bar reciprocable in said portion connected to said arm, a spring for holding said bar in one position, said bar having means thereon disposed to be engaged by said lever to move the same and operate said counter.

7. A mixing and dispensing device having in combination, a cylindrical container having a bottom with a sector-shaped opening therethrough, a member revoluble in said container having a central portion and spaced partitions radiating therefrom, the space between said partitions being substantially similar to said opening, means for intermittently rotating said member, and a plate above said member having an opening therethrough shaped substantially as one of said spaces and covering said member save for said opening, said plate being adapted to support comminuted material, whereby said material will pass through the opening in said plate and the spaces between said radial partitions will not be filled until coming beneath said opening.

8. A mixing and dispensing device having in combination, a standard having a base and a supporting portion at its upper end, a member carrying a dispensing mechanism mounted on said supporting portion, said member having a front substantially vertical plane surface, said surface having spaced cylindrical holes therein, a motor casing having a flat surface engaging said front surface and having pins secured therein and projecting therefrom receivable in and fitting in said holes, said pins having vertical holes therethrough, said member having holes extending vertically from its top downwardly therefrom and alined with said holes in said pins when said pins are disposed in said member, and removable rods insertable in said last mentioned holes to pass through said holes and hold said motor casing in place.

9. The structure set forth in claim 8, said member having top and bottom surfaces and said motor casing having top and bottom surfaces horizontally alined respectively with said surfaces, and a shaft projecting downwardly from said motor casing alongside of said standard, having a mixing device at its lower end.

10. A mixing and dispensing device having in combination, a cylindrical container having a bottom with a discharge opening therethrough, a revoluble member in the bottom of said container having a central portion and partitions forming a series of circumferentially spaced pockets, said opening being shaped substantially the same as said pockets in plan, means for intermittently rotating said member and a plate above said member and covering said member and having an opening therethrough shaped substantially the same as said pockets in plan whereby material can pass through said last mentioned opening and fill said pockets as each pocket passes therebeneath, said material being carried around by said member and dropped out through said first mentioned opening.

THEODORE M. COSTAKOS.